United States Patent [19]

Rasshofer et al.

[11] Patent Number: 4,532,266

[45] Date of Patent: Jul. 30, 1985

[54] POLYMER-CONTAINING POLYETHER POLYAMINES AND A PROCESS FOR THE PRODUCTION OF THESE POLYAMINES

[75] Inventors: Werner Rasshofer, Cologne; Gerhard Ballé; Dieter Dieterich, both of Leverkusen; Holger Meyborg, Odenthal, all of Fed. Rep. of Germany

[73] Assignee: Bayer Aktiengesellschaft, Leverkusen, Fed. Rep. of Germany

[21] Appl. No.: 360,037

[22] Filed: Mar. 19, 1982

[30] Foreign Application Priority Data

Mar. 27, 1981 [DE] Fed. Rep. of Germany ....... 3112118

[51] Int. Cl.$^3$ ................. C07C 127/15; C07C 127/24
[52] U.S. Cl. ..................... 521/159; 521/137; 521/134; 528/60; 528/64; 528/68; 528/482; 528/489; 560/157; 560/24; 560/159; 564/38; 564/57; 564/59; 564/61; 564/511; 564/512
[58] Field of Search ............. 521/137, 134, 159; 528/60, 64, 482, 489; 560/157, 24, 159; 564/38, 57, 59, 61, 511, 512

[56] References Cited

U.S. PATENT DOCUMENTS

| | | | |
|---|---|---|---|
| 3,044,989 | 7/1962 | Shivers, Jr. | 260/77.5 |
| 3,184,502 | 5/1965 | Müller et al. | 260/482 |
| 3,385,829 | 5/1968 | Heydkamp et al. | 260/75 |
| 3,625,871 | 12/1971 | Traubel et al. | 260/2.5 AY |
| 3,865,791 | 2/1975 | Brinkmann et al. | 260/77.5 CH |
| 3,931,450 | 1/1976 | Patton, Jr. et al. | 521/137 |
| 4,224,417 | 9/1980 | Hajek et al. | 521/166 |
| 4,286,074 | 8/1981 | Davis et al. | 521/137 |
| 4,386,218 | 5/1983 | Rasshofer et al. | 564/38 |

FOREIGN PATENT DOCUMENTS

| | | |
|---|---|---|
| 55-007825 | 1/1980 | Japan . |
| 1033912 | 7/1963 | United Kingdom . |
| 1117494 | 12/1965 | United Kingdom . |

Primary Examiner—John Kight
Assistant Examiner—M. L. Moore
Attorney, Agent, or Firm—Gene Harsh; Joseph C. Gil; Lyndanne M. Whalen

[57] ABSTRACT

Polyether-based urethane-group-containing polyamines containing polymers and/or copolymers of unsaturated monomers and, optionally, urea and/or biuret and/or allophanate groups are produced by (a) reacting an NCO-prepolymer in aqueous alkaline solution at 0° to 40° C. to form a carbamate; (b) converting this carbamate to an amine by adding an ion exchanger to the reaction mixture; and (c) separating the polyamine from the reaction mixture. The NCO-prepolymers used as starting materials are prepolymers of (i) polyalkylene ether polyols having a molecular weight of from 1,000 to 10,000 containing from 1 to 60 wt. % of graft (co)-polymers of unsaturated monomers; and (ii) excess molar quantities of organic polyisocyanate; and optionally, (iii) a low molecular weight chain-extending agent. The product polyamines have a molecular weight of from 1,000 to 10,000 and contain from 0.65 to 59.3 wt. % graft (co)polymer and from 0.11 to 2.9 wt. % terminal $NH_2$ groups attached to the ethers by urethane groups in the polyisocyanate. The product polyamines are particularly useful in the production of polyurethanes.

13 Claims, No Drawings

POLYMER-CONTAINING POLYETHER POLYAMINES AND A PROCESS FOR THE PRODUCTION OF THESE POLYAMINES

BACKGROUND OF THE INVENTION

This invention relates to polyether-based, urethane-group-containing polyamines which contain polymers and/or copolymers of unsaturated compounds, preferably in the form of graft polymers, and optionally urea and/or biuret and/or allophanate groups. The invention also relates to a process for the production of such polyamines by the hydrolysis of NCO-prepolymers containing terminal isocyanate groups.

Polyamines containing urethane groups are known to those in the art. German Auslegeschrift No. 1,270,046 for example, describes a process for the production of specific primary aromatic amines containing polyalkylene glycol ether segments in which reaction products of aromatic diisocyanates or triisocyanates with polyalkylene glycol ethers and/or polyalkylene glycol thioethers are reacted with secondary or tertiary carbinols. The products of this reaction are subsequently subjected (optionally in the presence of acid catalysts) to thermal decomposition in an inert solvent. One of the disadvantages of this process is that thermal decomposition of the urethanes is accompanied by formation of combustible, readily volatile alkenes which are explosive in admixture with air. Precautionary measures must therefore be taken.

German Auslegeschrift No. 1,694,152 relates to the production of prepolymers containing at least two terminal amino groups by reacting hydrazine, aminophenyl ethyl amine or other diamines with an NCO-prepolymer of a polyether polyol and a polyisocyanate (NCO/NH-ratio=1:1.5 to 1:5). In this process, unreacted amine has to be carefully removed in an additional step because it catalyzes the reaction with polyisocyanates to a considerable extent (thus leading to short processing times) and may act as a reactant.

Another process for synthesizing polyamines containing urethane groups is described in French Pat. No. 1,415,317. In this process, NCO-prepolymers containing urethane groups are converted with formic acid into the N-formal derivatives which are then hydrolyzed to form terminal aromatic amines. The reaction of NCO-prepolymers with sulfamic acid in accordance with German Auslegeschrift No. 1 155 907 (U.S. Pat. No. 3,184,502) also gives compounds containing terminal amino groups. Relatively high molecular weight, prepolymers containing aliphatic secondary and primary amino groups are obtained in German Auslegeschrift No. 1,215,373 by reacting hydroxyl compounds of relatively high molecular weight with ammonia in the presence of catalysts under pressure at elevated temperatures. Such prepolymers are made in U.S. Pat. No. 3,044,989, by reacting polyhydroxyl compounds of relatively high molecular weight with acrylonitrile followed by catalytic hydrogenation. According to German Offenlegungsschrift No. 2,546,536 and U.S. Pat. No. 3,865,791, relatively high molecular weight compounds containing terminal amino groups and urethane groups are also obtained by reacting NCO-prepolymers with enamines, aldimines or ketimines containing hydroxyl groups, followed by hydrolysis.

It is known that aromatic isocyanates can be converted into primary amines by acid hydrolysis. However, the reaction is far from complete because the amine formed during hydrolysis reacts further with unreacted isocyanate to form the corresponding urea. This further reaction cannot be suppressed even by using excess strong mineral acid. (See, e.g., Japanese Patent No. 55007-825).

It is also known that polyurethanes which have been produced from so-called polymer polyols, which are polyether polyols graft-modified by polymers or copolymers of olefinically unsaturated monomers, are distinguished by an improved property level. In particular, the hardness and durability of flexible polyurethane foams is favorably affected so that low unit weights can be adjusted and savings made on raw materials. Additionally, these polymer polyols provide flexible foams with more open cells and, as a result, counteract shrinkage of fresh foams during storage. Finally, it is possible to use polymer polyols (provided that the basic polyether is suitably selected) to produce so-called highly elastic, cold-hardening foams. In contrast to conventional processes for the production of foams of this type, there is no need to use special polyisocyanates characterized by balanced reactivity. It is therefore possible to use standard commercial products, particularly the tolylene diisocyanate used predominantly in the manufacture of flexible foams.

SUMMARY OF THE INVENTION

It is an object of the present invention to provide a process for the production of polyether-based urethane group-containing polyamines containing polymers or copolymers of unsaturated compounds grafted onto the polyether (hereinafter referred to as "polymer polyether polyamines").

It is also an object of the present invention to provide a technically simple process for the production of polymer polyether polyamines.

It is another object of the present invention to provide new polymer polyether polyamines which are particularly useful in the production of polyurethanes.

These and other objects which will become apparent to those skilled in the art are accomplished by reacting an NCO-prepolymer of a specific type in an alkaline aqueous medium at a temperature of from 0° to 40° C. to form the corresponding carbamate. This carbamate is then converted to an amine by means of an ion exchanger. The polymer polyether polyamine thusproduced is based on polyalkylene ether residues having a molecular weight of from 1,000 to 10,000, a graft polymer or copolymer content of from 0.65 to 59.3 wt. % and from 0.11 to 2.9 wt. % terminal $NH_2$ groups attached to the polyalkylene ether residue by a urethane group in the organic polyisocyanate.

DETAILED DESCRIPTION OF THE INVENTION

The polymer polyether polyamines of the present invention may be directly obtained by introducing corresponding NCO-prepolymers dropwise into excess aqueous alkaline medium, treating the alkali carbamates formed with acid ion exchanger and thus converting the NCO-groups into amino groups. This is an unexpectedly smooth reaction which does not involve any problems in terms of process technology.

More specifically, the polyether-based, urethane-group-containing polyamines, which contain polymers and/or copolymers of unsaturated monomers and, optionally, urea and/or biuret and/or allophanate groups, are produced by hydrolyzing urethane-group-containing NCO-prepolymers of (i) a bifunctional or higher functional polyalkylene ether polyol having a molecular weight of from 1,000 to 10,000 (preferably from 2,000 to 6,000) which contains from 1 to 60 wt. % (preferably from 5 to 40 wt. %, most preferably from 10 to 30 wt. %) of grafted-on polymer(s) and/or copolymer(s) of an unsaturated monomer and optionally, urea, biuret and/or allophanate groups, and (ii) an excess molar quantity of an organic polyisocyanate, and optionally (iii) a low molecular weight chain-extending agent having a molecular weight of from 18 to 400. This prepolymer is converted into the corresponding carbamate in aqueous dispersion by introducing the prepolymer into an alkaline aqueous medium, (optionally in the presence of an inert water-miscible organic solvent) at a temperature in the range from 0° to 40° C., preferably from 10° to 25° C. The equivalent ratio between OH-groups and NCO-groups should be greater than 1.01:1. The thus-produced carbamate is then converted into an amine with elimination of carbon dioxide by the addition of an equivalent or excess quantity of an acid ion exchanger. The polymer polyether polyamine containing urethane groups thus obtained is subsequently separated off from the reaction mixture in accordance with techniques known to those in the art.

The present invention also relates to polyalkylene-ether-based, urethane-group-containing polyamines containing aliphatic and/or aromatic amino groups obtained by the hydrolysis of corresponding NCO-prepolymers and containing graft polymers or copolymers of unsaturated monomers and, optionally, urea and/or biuret and/or allophanate groups.

The polymer polyether polyamines of the present invention may be synthesized from polyalkylene ether polyol residues having a molecular weight of from 1,000 to 10,000 (preferably from 2,000 to 6,000) which contain grafted-on polymers and/or copolymers of unsaturated compounds in quantities of from 1 to 60 wt. % (preferably from 5 to 40 wt. %, most preferably from 10 to 30 wt. %) and in which terminal amino groups are attached to the polyether by urethane groups of the polyisocyanate.

The polymer polyether polyamines of the present invention contain from 2.9 to 0.11 wt. % (preferably from 1.7 to 0.18 wt. %) of free $NH_2$-groups so the functionality is generally from 2 to 3. These polymer polyether polyamines have a polymer content of from 0.65 to 59.3 wt. %, preferably from 0.8 to 59 wt. % and most preferably from 9.35 to 28 wt. %.

The amino groups of the polyether polyamines of the present invention may be attached to aliphatic, cycloaliphatic or, preferably, aromatic residues derived from aliphatic, cycloaliphatic or aromatic polyisocyanates in the production of the prepolymers with the polymer polyols. These residues of the isocyanates are attached by means of urethane groups to the polymer-containing polyether polyol residues (formed from polyols and isocyanates).

Where the NCO-prepolymers still contain urea, biuret and/or allophanate groups (either in the starting material itself or formed during the reaction in which the NCO-prepolymer is formed), these groups are also present in the product polyamines because the process of the present invention involves a non-destructive hydrolysis reaction and careful working up of the reaction products.

The present invention also relates to the use of the polyalkylene-ether-based, urethane-group-containing polyamines containing graft polymers of unsaturated monomers and optionally urea and/or biuret and/or allophanate groups obtainable by the process of the present invention as synthesis components in the production of homogeneous and/or cellular polyurethane plastics and foams. Such polyurethanes may be formed by reacting polyisocyanates with the polymer polyether polyamines of the present invention and optionally other low molecular weight and/or relatively high molecular weight compounds containing isocyanate-reactive groups, optionally in the presence of known additives and auxiliaries.

The process of the present invention is particularly surprising because in the production of NCO-prepolymers from polyisocyanates and NCO-reactive compounds containing H-atoms, traces of monomeric isocyanate often remain in the prepolymer. In the process of the present invention, however, it is only the corresponding low molecular weight polyamines which form complexes with the ion exchanger and which can be removed with the ion exchanger from the reaction mixture. Surprisingly, however, this association with the ion exchanger does not occur with polyamines of relatively high molecular weight. Consequently, polymer polyether polyamines of relatively high molecular weight may be obtained directly (rather than through formation of mineral acid salts) and with considerably improved molecular consistency in the process of the present invention.

The process of the present invention is advantageous because the ion exchanger may be added to the carbamate solution or suspension or vice versa without affecting the results. Further, there is nothing in the least aggressive about the process of the present invention. Consequently, the product polyamines (including aromatic polyamines) are generally obtained in the form of colorless to pale yellowish products which due to the absence of impurities, oxidize and discolor far more slowly than polyamines prepared by other processes. In fact, the process of the present invention is so mild that even sensitive, biuret-group-containing and/or allophanate-group-containing polyamines may be produced without any difficulty.

It is possible to use more than the equivalent quantity of acid ion exchanger (based on the H-atoms) without the relatively high molecular weight polyamines being converted into the corresponding salts. However, this would necessitate an additional process step in which the undesirable salt is accumulated as is the case where the decomposition of the carbamates is carried out with excess mineral acid.

In accordance with the present invention, the NCO-prepolymers used as starting materials may be obtained from polymer polyols of the type obtained by the radical in situ polymerization of unsaturated compounds ("monomers") in the presence of bifunctional and/or higher functional polyalkylene oxide polyols (polyethers). One or more vinyl monomers are generally used for this purpose. Such vinyl monomers include styrene, methyl styrene, acrylonitrile, methacrylonitrile, acrylic acid alkyl ester, methacrylic acid alkyl ester and other known monomers, optionally in modifying quantities. It is preferred to use styrene, α-methyl styrene, acrylonitrile and (meth)acrylic acid methyl ester. Copolymers of styrene and acrylonitrile are particularly preferred.

The production of polyether polyols modified by polymers or copolymers is known. Such modified polyether polyols may be obtained by grafting polymer-modified polyether polyols, although ungrafted polymers may also be present in the mixture. The production and use of polymer polyols of this type are described for example in U.S. Pat. Nos. 3,304,273 and 2,383,351; in German Auslegeschrift No. 2,915,260; German Pat. Nos. 1,222,660, 1,152,536 and 1,152,537; and also in the article by F. E. Critchfield et al in Rubber Chemistry and Technology, 45 (1972), pages 1467 to 1481. The polyethers which are used to be modified with polymers by polymerisation of monomers are known and generally contain from 2 to 8 (preferably 2 to 3) hydroxyl groups. Such polyethers may be obtained for example by polymerizing epoxides, such as ethylene oxide, propylene oxide, butylene oxide, tetrahydrofuran, styrene oxide or epichlorohydrin. Polyethers may also be produced by addition of epoxides (preferably ethylene oxide or propylene oxide), optionally in admixture, in any ratio or successively with starter components containing reactive hydrogen atoms. Suitable compounds containing reactive hydrogen atoms are water, alcohols, ammonia and amines. Examples of these include ethylene glycol, 1,2-propylene glycol, trimethylol propane, glycerol, sorbitol, 4,4'-dihydroxy diphenyl propane, aniline, ethanolamine, diethanolamine, N-methyl diethanolamine and ethylene diamine. Sucrose polyethers and formitol- or formose-started polyethers may also be used to modify polymers with monomers. In many cases, it is preferred to use polyethers of the type which contain predominantly primary OH-groups (up to 90 wt. % based on all the OH-groups present in the polyether). The polyalkylene oxide polyols based on ethylene oxide, propylene oxide and tetrahydrofuran are preferred.

The difunctional and higher functional polyether polyols used in the practice of the present invention should have a molecular weight in the range from about 1,000 to 10,000, preferably in the range from 2,000 to 6,000 and a functionality of preferably from 2 to 3.

The polymer content of the polymer polyether polyols used to form the NCO prepolymers required in the present invention should amount to between 1 and 60 wt. % of polymer (preferably in grafted form), preferably between 5 and 40 wt. % and most preferably, between 10 and 30 wt. % based on the polyether polymer end product.

Low molecular weight, H-active compounds having a molecular weight of from 18 to about 400 may optionally be used in small quantities in the reaction of the polymer polyols with the polyisocyanates to form the NCO-prepolymer. These compounds, which are also known as chain-extending agents, should be used in quantities of less than 0.5 mole and preferably in quantities of from 0.01 to 0.2 mol per mole of polymer polyol. Suitable compounds of this type are water; diols, such as ethylene glycol, 1,2-propylene glycol, 2,3-butane diol and/or 1,4-butane diol, neopentyl glycol; isophorone diamine; neopentyl diamine; 2,4- and/or 2,6-tolylene diamine; tetraalkyl-dicyclohexyl methane-2,4'- and/or -4,4'-diamines; polyethylene oxide; propylene oxide; and tetramethylene oxide diols having molecular weights below 400. Use of these chain-extending agents makes it possible to incorporate other urethane and/or urea groups and possibly allophanate or biuret groups (formed during the reaction with the polyisocyanates) into the NCO-prepolymer.

Suitable polyisocyanates for the practice of the present invention are aliphatic, cycloaliphatic, araliphatic, aromatic and heterocyclic polyisocyanates free from hydrolyzable groups (apart from NCO-groups), of the type described in detail for example on pages 8 to 11 of German Offenlegungsschrift No. 2,854,384.

Preferred polyisocyanates are diisocyanates such as 1,4-tetramethylene diisocyanate, 1,6-hexamethylene diisocyanate, 1,12-dodecane diisocyanate; cycloaliphatic diisocyanates in the form of mixtures of their position- and/or stereo-isomers such as cyclobutane-1,3-diisocyanate, cyclohexane-1,3- and 1,4-diisocyanate, 1-isocyanato-3,3,5-trimethyl-5-isocyanatomethyl cyclohexane, 2,4- and 2,6-hexahydrotolylene diisocyanate, hexahydro-1,3- and/or -1,4-phenylene diisocyanate, perhydro-2,4'- and/or -4,4'-diphenyl methane diisocyanate. However, aromatic diisocyanates are particularly suitable. Examples of these diisocyanates are 1,3- and 1,4-phenylene diisocyanate, 2,4- and 2,6-tolylene diisocyanate and mixtures of these isomers, diphenyl methane-2,4'-, -2,2'- and/or -4,4'-diisocyanate, including its alkyl- and chlorine-substitued derivates and naphthylene-1,5-diisocyanate. It is also possible to use polyphenyl-polymethylene-polyisocyanates of the type obtained by condensing aniline with formaldehyde and then phosgenating the condensation product. Polyisocyanates containing isocyanurate groups, urethane groups, acylated urea groups, allophanate groups and biuret groups may also be used.

It is particularly preferred to use polyisocyanates having different degrees of reactivity between their NCO-groups. Such polyisocyanates include araliphatic diisocyanates or aromatic diisocyanates, such as tolylene-2,4-diisocyanate, diphenyl methane-2,4'-diisocyanate, 3',5'-dimethyl diphenyl methane-2,4'-diisocyanate, 3',5'-dimethyl diphenyl methane-4,4'-diisocyanate and 3,5-dimethyl-3',5'-diisopropyl-4,4'-diisocyanate. The diisocyanate most preferably used on a commercial scale is tolylene-2,4-diisocyanate.

The NCO-prepolymers containing terminal isocyanate groups used in the hydrolysis reaction of the present invention may be produced in known manner by reacting the reactants either as a melt or in solution. In either case, the equivalent ratio of NCO-groups to active hydrogen atoms (preferably OH-groups) is greater than 1 and should generally be between 1.5:1 and 2.8:1. It is of course possible to use an even larger excess of polyisocyanate, for example 10:1. Any excess polyisocyanate may be removed by thin-layer evaporation, leaving NCO-prepolymers having a composition which is relatively close to two equivalents of NCO-groups for each equivalent of active hydrogen.

The prepolymers are generally oily to wax-like in consistency, depending upon the starting components selected. If the NCO/OH ratio is greater than 2, non-extended prepolymers are generally obtained. If the NCO/OH-ratio is less than 2, the average molecular weight of the NCO-prepolymers will increase and urethane groups will become attached thereto.

It is also possible to use low molecular weight polyols or other chain-extending agents in small quantities (in addition to the relatively high molecular weight polymer polyethers) in the production of the prepolymers. When these materials are used, the prepolymers obtained are also of relatively high molecular weight.

Where the starting components include diamines as chain-extending agents or urea-containing, biuret-containing or allophanate-containing polyisocyanates, these groups are also incorporated into the NCO-prepolymers. Allophanate and biuret groups can also be formed from the reaction of urea or urethane-containing prepolymers under rigorous reaction conditions. In either case, urethane groups are present in the NCO-prepolymer as a result of the linking reaction between the polymer polyether polyol and the polyisocyanate.

In the process of the present invention, the NCO-prepolymers are generally first dissolved in an inert organic solvent which solvent is at least partly miscible with water. Suitable solvents are, for example, dimethoxy ethane (DME), tetrahydrofuran and dioxane. For example, from 1 to 400 parts of the NCO-prepolymer may be used for each 100 parts of solvent. It is generally best to introduce the prepolymer slowly with stirring (preferably over a period of 30 to 120 minutes) into a solution of alkali or alkaline-earth hydroxides in water and/or another water-miscible solvent free from NCO-active hydrogen atoms at between about 0° and 40° C., preferably to between 10° and 25° C. The concentration of these alkali (or alkaline-earth) materials should preferably be 1 part by weight of base to between 2 and 20 parts by weight of water or solvent. Solutions of inorganic and organic ammonium hydroxides (for example tetra-alkyl ammonium hydroxide) are also suitable. From 5 to 20 wt. % alkali hydroxide solutions are preferable.

If no solvent is used, the viscosity of the NCO-prepolymer should be as low as possible (preferably up to about 500 mPas). At sufficiently low viscosities, the prepolymer may have to be preheated (for example to between 30° and 90° C.) before it is added to the alkali or alkaline-earth material. The prepolymer should be added with vigorous stirring in the finest possible distribution (for example by injection through a nozzle under pressure). The amount of water initially introduced may be increased by a factor of from 1.1 to 100 to make stirring easier.

The quantity in which the alkali (alkaline-earth) hydroxide is used or the quantity in which the bases are used should be such that at least a small quantity of free base is left on completion of the reaction. An NCO-/OH-ion ratio of from 1:1.01 to 1:1.60 and use of alkali hydroxides are preferred for this purpose. The concentration of residual base should not be too high because urethane groups present in the prepolymer after formation of the carbamate would also be hydrolyzed. In order to improve the homogeneity of the solutions, it is preferred to add a standard commercial emulsifier in quantities of from 0.1 to 1 part by weight and preferably in a quantity of approximately 0.5 part by weight (per 100 parts of reaction mixture). Intensive stirring is advisable when the NCO-component is being mixed with the hydroxide component in order to avoid local imbalances in concentration. After the prepolymer has been added, the mixture should be stirred for another 5 to 180 minutes and preferably for 10 to 60 minutes at 0° to 40° C.

It may be advantageous to lower the viscosity of the carbamate prior to treatment with the ion exchanger. The viscosity may be lowered by dilution with a suitable solvent. Suitable solvents are dioxane, tetrahydrofuran, acetonitrile, methanol, ethanol, i-propanol. Methanol is preferred.

In the second step of the process of the present invention, the carbamate solution or carbamate suspension is combined with an ion exchanger. It does not matter whether the acid ion exchange resin is added to the carbamate suspension or carbamate solution or whether the reverse procedure is adopted. The ion exchange resin and the carbamate should be combined with one another at a rate commensurate both with the intensity of the evolution of gas and with the dimensions of the apparatus. Periods of from 1 to 300 minutes, particularly 10 to 90 minutes may be appropriate. The evolution of gas generally begins only after about one quarter of the total quantity of ion exchange resin has been added. However, the evolution of gas is not sudden or violent, but takes place steadily and is easy to control. When the components are combined, there should be little or no increase in temperature. A temperature change of from 10° to 70° C. (which may have to be adjusted by external heating) has been found to be acceptable.

The exchanger should be added until there is no further evolution of gas. Brief heating to 60°–110° C. should drive out any dissolved carbon dioxide.

The acid ion exchange resin should be used in a quantity which is at least sufficient to neutralize the base used in the first stage of the process. In general, however, it is desirable to use a small excess of protons emanating from the acid ion exchange resin. From 1.01 to 2 equivalents of hydrogen ions are generally used for each equivalent of base (expressed as OH).

The reverse procedure (i.e., addition of carbamate to the ion exchanger) is preferred when the reaction data are known and where the process is carried out continuously. On completion of the ion exchange reaction, the reaction mixture is basic due to the presence of free amine and its base strength.

Ion exchangers suitable for use in the process of the present invention include any substances which contain labile acid hydrogen atoms in an insoluble polymeric skeleton. Polymeric acids that are particularly suitable for use in the process of the present invention are ion exchange resins which have as their polymeric base a styrene/divinyl benzene skeleton to which base sulfonic acid groups are attached as acid functions. Other polymeric acids which may be used are ion exchange resins which have a polyacrylate skeleton as their polymeric base to which base carboxylic acid anchor groups are attached.

The reaction mixture may then be treated to remove spent ion exchanger (e.g., by filtration). The solvent may be removed by distillation under reduced pressure, for example under a pressure of from 0.01 to 700 Torr. The spent ion exchange resins (neutral form) may be regenerated by known methods and reused without difficulty. All the polymer polyether polyamines thus-obtained may be freed from traces of volatile constituents at 0.01 to 0.1 Torr/60°–80° C.

Due to their low vapor pressure, the polymer polyether polyamines of the present invention may advantageously be used as polyisocyanate reactants in the production of optionally cellular polyurethane plastics. These polymer polyether polyamines may be used alone or in combination with other low molecular weight (molecular weight 32–399) and/or relatively high molecular weight (molecular weight 400 to approximately 15,000) compounds containing isocyanate-reactive groups to produce polyurethanes. The polymer polyether polyamines of the present invention are particularly suitable for high-frequency-weldable polyurethane-based flexible foam plastics.

The polyamines of the present invention may also be used as coupling components for diazo dyes, hardeners for epoxide and phenolic resins and any other known reactions involving amines (such as amide-forming or imide-forming reactions, etc.).

Homogeneous and/or cellular polyurethane plastics and elastomers or foams, may be produced from the polymer polyether polyamines of the present invention in known manner with materials normally used for making such polyurethanes (see for example, German Offenlegungsschrift Nos. 2,302,564; 2,432,764; 2,512,385; 2,513,815; 3,550,796; 2,550,797; 2,550,833; 2,550,860; 2,550,862 and 2,639,083).

The compounds identified above as being useful for production of the NCO-prepolymers may also be used as a polyisocyanate reactant in the production of polyurethanes. Further examples are aliphatic, cycloaliphatic, araliphatic, aromatic and heterocyclic polyisocyanates. Polyisocyanates which have been further modified as described on pages 8 to 11 of German Offenlegungsschrift No. 2,854,384 may also be employed.

Compounds containing at least two isocyanate-reactive hydrogen atoms and having a molecular weight of generally from 62 to 10,000 (for each individual component) may be employed in the usual way as polyol starting components for the production of the homogeneous or cellular polyurethane plastics and elastomers or foams (including integral foams). It is preferred that compounds containing hydroxyl groups, particularly compounds of relatively high molecular weight containing from 2 to 8 hydroxyl groups, preferably compounds having molecular weights in the range from 400 to 8,000 and most preferably in the range from 600 to 6,000 be used as the predominant reactive hydrogen-containing compound. Examples of such compounds are polyesters, polyethers, polythioethers, polyacetals, polycarbonates and polyester amides and mixtures thereof containing two, generally from 2 to 8 and preferably from 2 to 4 hydroxyl groups. These compounds may be mixed with other low molecular weight polyfunctional compounds, such as polyols (preferred), polyamines or polyhydrazides, having molecular weights in the range from about 62 to 400. Such low molecular weight polyfunctional polyols are generally included to modify the properties of the product polyurethane.

The polyethers containing at least 2, generally from 2 to 8 and preferably 2 or 3 hydroxyl groups are preferably used as the reactive hydrogen-containing compound in the production of polyurethanes. Appropriate polyethers are known to those in the art. Such polyethers may be obtained by polymerizing epoxides, such as ethylene oxide, propylene oxide, butylene oxide, tetrahydrofuran, styrene oxide or epichlorohydrin. This polymerization may be carried out using only the epoxide or by addition of these epoxides (preferably ethylene oxide and propylene oxide) to starter components. The epoxides may be used in admixture (e.g., in a ratio of from 5:95 to 95:5) or added successively. Appropriate starter components contain reactive hydrogen atoms and include compounds such as water, alcohols, ammonia and amines. Specific examples of starter components are: ethylene glycol; 1,3- or 1,2-propylene glycol; trimethylol propane; glycerol; sorbitol; 4,4'-dihydroxy diphenyl propane; aniline; ethanolamine; and ethylene diamine. It is also possible to use sucrose polyesters and formitol-started or formose-started polyethers. In many cases, it is preferred to use polyethers which contain predominantly primary OH-groups (up to 90 wt. %, based on all the OH-groups present in the polyether).

Polyesters containing hydroxyl groups which may be used to produce polyurethanes include the reaction products of polyhydric (preferably dihydric and even trihydric) alcohols with polybasic (preferably dibasic) aliphatic, cycloaliphatic, aromatic and/or heterocyclic carboxylic acids. Appropriate carboxylic acids are adipic acid, sebacic acid, isophthalic acid, trimellitic acid, phthalic acid anhydride, hexahydrophthalic acid anhydride, tetrachlorophthalic acid anhydride, endomethylene tetrahydrophthalic acid anhydride, fumaric acid, dimerized or trimerized unsaturated fatty acids, terephthalic acid dimethyl ester and terephthalic acid-bis-glycol ester. Suitable polyhydric alcohols include: ethylene glycol, 1,2-propane diol, 1,3-propane diol, 1,4-butane diol, 2,3-butane diol, 1,6-hexane diol, 1,8-octane diol, neopentyl glycol, 1,4-bis-hydroxy methyl cyclohexane, 2-methyl-1,3-propane diol, glycerol, trimethylol propane, 1,2,6-hexane triol, trimethylol ethane, pentaerythritol, sorbitol, formitol, methyl glycoside, di-, tri-, tetra- and higher polyethylene glycols, propylene glycols and butylene glycols. Polyesters of lactones (e.g., ε-caprolactone) or of hydroxy carboxylic acids (e.g., ω-hydroxy caproic acid) may also be used. Mixtures of 2 or more polyols or 2 or more carboxylic acids should be used in cases where it is desired to obtain liquid polyester polyols. Other suitable polyhydroxyl compounds are described at pages 11 to 21 of German Offenlegungsschrift No. 2,854,384.

Other compounds containing at least 2 isocyanate-reactive hydrogen atoms and having a molecular weight in the range from 62 to 400 may also be used as reactive components for the production of polyurethanes in accordance with the present invention. Such compounds include those containing hydroxyl groups and also compounds containing amino groups and/or thiol groups and/or carboxyl groups and/or hydrazide terminal groups, which are known as chain-extending agents or cross-linking agents. These compounds generally contain from 2 to 8 (preferably from 2 to 4) isocyanate-reactive hydrogen atoms, particularly hydroxyl groups. It is possible to use mixtures of these compounds having a molecular weight in the range from 62 to 400. Examples of such compounds are ethylene glycol, 1,2-propane diol, 2,3-butane diol, 1,4-butane diol, neopentyl glycol, 1,4-bis-hydroxymethyl cyclohexane, 2-methyl-1,3-propane diol, dibromobutene diol, trimethylol propane, pentaerythritol, quinitol, sorbitol, castor oil, diethylene glycol, 4,4'-dihydroxy diphenyl propane, dihydroxy ethyl hydroquinone, ethanolamine, diethanolamine, N-methyl diethanolamine, N-tert.-butyl-di-(β-hydroxypropylamine), triethanolamine and 3-aminopropanol. Examples of other such compounds are given on pages 20 to 26 of German Offenlegungsschrift No. 2,854,384.

Additionally, compounds having a functionality of 1 with respect to isocyanates may be used as chain terminators. Monoamines such as butyl or dibutyl amine, stearyl amine, N-methyl stearyl amine, piperidine, cyclohexyl amine; or monoalcohols, such as butanol, 2-ethyl hexanol, ethylene glycol monomethyl ether, may be used as chain terminators in quantities of from 0.01 to 10 wt. % (based on polyurethane solids).

It is also possible to use catalysts known to those in the art in the production of polyurethanes in accordance with the present invention. Tertiary amines, such as triethyl amine, n-methyl morpholine, tetramethyl ethylene diamine, 1,4-diazabicyclo-(2,2,2)octane, bis-(dimethylaminoalkyl)-piperazines, dimethyl benzylamine, 1,2-dimethyl imidazole, monocyclic and bicyclic amidines, bis-(dialkylaminoalkylethers) and tertiary amines containing amide (preferably formamide) groups are appropriate catalysts. Organometallic compounds, such as organic tin(II)compounds, are particularly useful catalysts. In addition to sulfur-containing compounds, such as dioctyl tin mercaptide, organotin compounds which may be used as catalysts are tin(II)-salts of carboxylic acids, such as tin(II)acetate, tin-(II)ethyl hexoate; and tin(IV)compounds, for example dibutyl tin dichloride, dibutyl tin diacetate, dibutyl tin dilaurate or dibutyl tin maleate. All of these catalysts may, of course, be used in the form of mixtures. Other examples of catalysts suitable for use in the practice of the present invention and information on the way in which they function can be found in Vieweg and Hochtlen's Kunststoffhandbuch, Vol. VII, Carl-Hanser-Verlag, Munich, 1966, for example on pages 96 to 102, and in German Offenlegungsschrift No. 2,854,384.

Known additives and auxiliaries may also be used to make polyurethanes from the polymer polyether polyamines of the present invention. Specifically, inorganic or organic substances which act as blowing agents, for example, methylene chloride, monofluorotrichloromethane, dichlorodifluoromethane, air, $CO_2$ and oxides of nitrogen are useful.

Surface-active additives, such as emulsifiers and foam initiators as well as foam stabilizers and reaction retarders may be employed in accordance with techniques known to those in the art. It is possible to use known cell regulators (such as paraffins or fatty alcohols or dimethyl polysiloxanes) as well as pigments or dyes and/or flameproofing agents, stabilizers against the effects of ageing and weather, plasticizers, fungistatic and/or bacteriostatic substances and fillers. Specific examples of such auxiliaries and additives are found on pages 26 to 31 of German Offenlegungsschrift No. 2,854,384 and in the literature references cited therein.

Polyurethane foams made from the polymer polyether polyamines of the present invention may be produced in accordance with techniques known to those in the art both in the form of free foams and in the form of molded foams. Such foams may be produced by block foaming or by known laminator processes or by any other technique known to those skilled in foam-manufacturing technology.

Polyurethane elastomers may be produced from the polymer polyether polyols of the present invention by casting, centrifugal casting or spraying with manual or machine mixing of the components in accordance with techniques known to those in the art.

The polymer polyether polyamines of the present invention should preferably be mixed with other polyols of relatively high molecular weight when used in making polyurethanes. In general, the polyamines of the present invention yield polyurethane products characterized by particularly high thermal stability, increased modulus and an improved resistance to hot water.

The invention is illustrated by the following Examples in which the quantities given represent parts by weight and percentages by weight, unless otherwise indicated.

EXAMPLES

EXAMPLE 1

1.1 Production of the NCO-prepolymer 900 g of a polymer polyol were added dropwise over a period of 90 minutes at 80° to 85° C. to 106 g (0.61 mole) of 2,4-diisocyanatotoluene. This mixture was then stirred for 120 minutes at that temperature. The polymer polyol used was difunctional, had an OH-number of 37, a viscosity of 1400 mPas at 25° C. and a polymer content of 34.6%. This polymer polyol was obtained by grafting a styrene/acrylonitrile (40:60) copolymer onto a 1,2-propylene-glycol-started polypropylene oxide ether having an OH-number of 56.

1.2 Production of the carbamate

A solution of the NCO-prepolymer of 1.1 (NCO content 2.74%) in 800 ml of dioxane was added dropwise over a period of 45 minutes at an internal temperature of 10° to 23° C. to a solution of 42.5 g of KOH (0.76 mole, OH:NCO =1.16) and 0.5 g of Mersolat ®-H (as emulsifier) in 150 ml of water. This mixture was stirred for 10 minutes at the internal temperature of 10° to 23° C.

1.3 Production of the amine 650 ml of Lewatit ®SPC 118 (ion exchanger) were added to the reaction mixture of 1.2. The evolution of $CO_2$ intensified after heating to 60° C. 14 liters of $CO_2$ were given off over a period of 3 hours (theoretical yield=14.6 1). After separation of the ion exchanger by filtration, the filtrate was freed from the solvent at 100° C./18 mbar and then at 100° C./0.8 mbar, leaving 870 g (88% of the theoretical yield) of a yellow product.

Product characterization

% by weight of $NH_2$ in the polymer polyether polyamine: 0.91

NH-number: 36.55 (theoretical value: 34)

Acid number: 2.1

Molecular weight (*): 3300 (theoretical value: 3296)

$H_2O$ (determined by Karl Fischer's method): 0.29%

Viscosity: 300 Pas (visco-elastic) (*) as determined by vapor pressure osmometry in toluene Lewatit ®SPC 118 (a product of Bayer AG) is a strongly acid cation exchanger containing —$SO_3H$— groups in a styrene/divinyl benzene matrix (DVB-content 18%). The macroporous/large-pored exchanger has a particle size distribution of from 0.3 to 1.5 mm and a total capacity of 1.4 to 1.5 milliequivalents per ml.

The above-described procedure was repeated using the following ion exchange resins: Lewatit SPC 108; SC 108; SC 104 and CNP 80. In each case, the product polyamine was obtained in yield and purity comparable to those of the product of Example 1. Information on these ion exchangers can be found in the relevant prospectuses published by Bayer AG, for example in the prospectus published on Aug. 1, 1979 under number OC/I 20 233.

EXAMPLE 2

2.1 Production of the NCO-prepolymer 1000 g of a polymer polyol were added dropwise over a period of 180 minutes at 80° C. to 86 g (0.49 mole) of 2,4-diisocyanatotoluene. This mixture was then stirred for 120 minutes at that temperature (i.e., 80° C.). The polymer polyol used was trifunctional, had an OH-number of 28, a viscosity of 1900 mPas/25° C. and a polymer content of 20%. The polymer was a styrene/acrylonitrile (40:60) copolymer which was radically grafted onto a trimethylol-propane-started polyether containing 83% of propylene oxide and 17% of ethylene oxide (OH-number 35).

2.2 Production of the carbamate

A solution of the NCO-prepolymer prepared in 2.1 (NCO-content 2.2%) in 600 ml of dioxane was added dropwise over a period of 45 minutes at an internal temperature of 18° to 20° C. to a solution of 37 g (0.66 mole) of KOH and 0.5 g of Mersolat H in 150 ml of water. This mixture was stirred for 15 minutes at an internal temperature of 18° to 20° C.

2.3 Production of the amine 700 ml of Lewatit SPC 118 were rapidly added to the reaction mixture of 2.2. After heating to 60° C., followed by addition of 500 ml of dioxane, 11.2 liters of $CO_2$ (theoretical: 12.75 l) were rapidly given off (80 minutes). After the ion exchanger had been separated off by filtration, the solvent was removed by distillation at 100° C./17 mbar and 100° C./0.13 mbar. 899 g (85% of theoretical yield) of a yellow product having a salve-like consistency were obtained.

Product data

% of $NH_2$ in the polymer polyether polyamine: 0.645
NH-number: 25.8 (theoretical 26.1)
Acid number: 0.9
Molecular weight: 6390 (theoretical 6438)
$H_2O$ (Karl Fischer's method): 0.21%.

EXAMPLE 3

3.1 Production of the polymer polyol

The polymer polyol used was trifunctional, had an OH-number of 42.3, a solids content (polymer fraction) of 18.7% (14.8% of acrylonitrile, 3.9% of styrene) and a viscosity of 2600 mPas at 20° C. This polymer polyol was prepared as follows:

12 kg of a glycerol-started polyoxy propylene ether triol containing 5% of terminal polyoxy ethylene blocks and having an OH-number of 56 were heated under nitrogen to 120° C. in a 100 liter capacity VA-autoclave equipped with a stirrer, reflux condenser, gas inlet pipe and a monomer feed unit. A mixture of 36 kg of this polyether triol, 2.4 kg of styrene, 9.6 kg of acrylonitrile and 120 g of azoisobutyronitrile (1%, based on monomer) were introduced into the autoclave over a period of 4 hours through a membrane metering pump with the temperature being maintained between 120° C. and 125° C. On completion of the addition, the reaction mixture was stirred for 3 hours at 120° C., after which a water jet vacuum was applied and all the volatile constituents were distilled off over a period of 7 hours, ultimately in an oil pump vacuum of 0.8 mbar. 950 g of a distillate containing 88.2% of acrylonitrile and 11.5% of styrene was condensed. The product data were as follows: monomer conversion 92.1%, acrylonitrile bound 14.8%, styrene bound 3.9%, solids content (polymer fraction) 18.7%.

3.2 Production of the NCO-prepolymer 1000 g of the polymer polyol of 3.1 were added dropwise over a period of 180 minutes at 80° C. to 131.4 g (0.755 mole) of 2,4-diisocyanatotoluene. This mixture was stirred for 120 minutes at that temperature. The NCO-prepolymer had an NCO-content of 3.0%.

3.3 Production of the carbamate

A solution of the prepolymer of 3.2 in 750 ml of dioxane was added dropwise over a period of 60 minutes at 20° to 25° C. to a solution of 55 g (0.98 mole) of KOH and 0.5 g of Mersolat®-H in 150 ml of water. This mixture was stirred for 15 minutes at an internal temperature of 20° to 25° C.

3.4 Production of the amine 1.2 liters of Lewatit®SPC 118 were added to the above reaction mixture over a period of 5 minutes. After heating to 60° C., followed by the addition of 500 ml of dioxane, 14.8 liters of $CO_2$ (theoretical 16.9 liters) were rapidly given off (45 minutes). After the evolution of gas had stopped, the ion exchanger was filtered off and the solvent was distilled off at 100° C./17 mbar and then at 100° C./0.14 mbar. A pale yellow product having a salve-like consistency was obtained in a quantity of 1070 g (93.5% of the theoretical yield).

Product Data

% by weight of $NH_2$ in the polymer polyether polyamine: 0.93
NH-number: 37.3
Acid number: 0.2
Molecular weight: 4500
$H_2O$ (Karl Fischer's method): 0.1%.

EXAMPLE 4

4.1 Production of the NCO-prepolymer 4000 g of a polymer polyol were added dropwise over a period of 180 minutes at 80° C. to 245 g (1.4 moles) of 2,4-diisocyanatotoluene. The temperature was then maintained at 80° C. for 180 minutes. The NCO-prepolymer had an NCO-content of 1.8%. The polymer polyol used was trifunctional, had an OH-number of 19.7, a viscosity of 3800 mPas/20° C. and a polymer content of 28.6%. It was obtained by grafting 16.7% of acrylonitrile and 11.9% of styrene onto a trimethylolpropane-started polyether of 87% of ethylene oxide and 13% of propylene oxide (OH-number 28).

4.2 Production of the carbamate

A solution of the prepolymer of 4.1 in 5 liters of dioxane was added dropwise over a period of 90 minutes at an internal temperature of 20° to 25° C. to a solution of 102 g (1.82 moles) of KOH and 1.5 g of Mersolat®H in 750 g of water. This mixture was stirred for 35 minutes at an internal temperature of 20° to 25° C.

4.3 Production of the amine 2.2 liters of Lewatit®SPC 118 (moist product) were added to the reaction mixture of 4.2 over a period of 5 minutes. After heating to 60° C., followed by the addition of 1 liter of methanol, 29.8 liters of $CO_2$ (theoretical yield: 31.4 liters) were rapidly given off (30 minutes). After the evolution of gas had stopped, the ion exchange resin was filtered off and the solvent was distilled off at 100° C./0.13 mbar. 3.9 kg (90% of theoretical yield) of a yellow product having a salve-like consistency were obtained.

Product data

% by weight of $NH_2$: 0.465
NH-number: 18.6
Acid number: 0.01
Molecular weight: 9000
$H_2O$ (Karl Fischer's method): 0.3

EXAMPLE 5

5.1 Production of the NCO-prepolymer 2 kg of a polymer polyol were added dropwise over a period of 150 minutes at 80° C. to 130.5 g (0.75 mole) of 2,4-diisocyanatotoluene. The temperature was then maintained at 180° C. for 120 minutes by which time the NCO-content amounted to 1.7%.

The polymer polyol used was difunctional, had an OH-number of 21, a viscosity of 3800 mPas/20° C. and a polymer content of 24.8% (12.5% of acrylonitrile, 12.3% of styrene). It was obtained by grafting acrylonitrile/styrene onto a 1,2-propylene-glycol-started polyether containing 85% by weight of propylene oxide and 15% by weight of ethylene oxide (OH-number 28).

5.2 Production of the carbamate

The prepolymer of 5.1 was heated to 75° C. and then added dropwise over a period of 120 minutes at an internal temperature of 25°–30° C. to a solution of 54.6 g (0.98 mole) of KOH and 2 g of Mersolat ®H in 2 liters of water. This mixture was stirred for 35 minutes. 3 liters of methanol were then added.

5.3 Production of the amine 1.2 liters of Lewatit ®SPC 118 (moist product) were added to the reaction mixture of 5.2 over a period of 5 minutes. The evolution of $CO_2$, which began spontaneously after addition of the ion exchanger, was completed by heating the mixture to 50° C. 16.1 liters (96% of theoretical yield) of $CO_2$ were given off over a period of 60 minutes. After the evolution of $CO_2$ had stopped, the ion exchange resin (charged K+-form) was filtered off. The filtrate gave two phases of which the lower methanol phase was freed from the solvent by distillation at 100° C./18 mbar and 100° C./0.15 mbar.

1950 g (94% of theoretical yield) of a yellow, salve-like product were obtained.

Product data
% by weight of $NH_2$: 0.46
NH-number: 18.4
Acid number: 0.05
Molecular weight: 6000
$H_2O$ (Karl Fischer's method): 0.28%

EXAMPLE 6

6.1 Production of the NCO-prepolymer 2000 g of a polymer polyol were added dropwise over a period of 240 minutes at 60° C. to 176 g (1.01 mole) of 2,4-diisocyanatotoluene. The temperature was then maintained at 60° C. for 240 minutes.

The polymer polyol used was trifunctional, had an OH-number of 28.3, a solids content of 19.1% (acrylonitrile:methylmethacrylate=48:52) and a viscosity of 2640 mPas at room temperature. The starting polyether triol was obtained by addition of propylene oxide and ethylene oxide with trimethylol propane and had an OH-number of 35.

6.2 Production of the carbamate

A solution of the NCO-prepolymer of 6.1 in 1 liter of dioxane was added dropwise over a period of 60 minutes at an internal temperature of 18° to 23° C. to a solution of 221 g (3.94 moles) of KOH and 1 g of Mersolat ®K in 1500 ml of water. This mixture was stirred for 30 minutes at an internal temperature of 18° to 23° C.

6.3 Production of the amine 4.8 liters of Lewatit ®SPC 118 (moist product) were added to the reaction mixture of 6.2 over a period of 15 minutes. After heating to 60° C., followed by the addition of 1.8 liter of methanol, 21 liters of $CO_2$ (93% of theoretical yield) were rapidly given off (38 minutes). After the evolution of gas had stopped, the charged ion exchange resin was filtered off and the solvent distilled off at 100° C./18 mbar and then at 100° C./0.25 mbar. 2.04 kg (95% of theoretical yield) of a yellow-tinged, salve-like material characterized by the following data were obtained:

% by weight of $NH_2$: 0.547
NH-number: 21.9
Acid number: 0.01
Molecular weight: 7700
$H_2O$ (Karl Fischer's method): 0.18%.

EXAMPLE 7

This example illustrates use of the polymer polyamines of the present invention in making a flexible cold foam.

7.1 Comparison Example (using known normal polyols)

Formulation:
polyol component mixture
    75 parts of polyol I
    25 parts of polyol II
    3.1 parts of water
    1.0 part of Dabco 33LV ® (an amine catalyst manufactured by Air Products)
    1.5 parts of PU 3117 (a flexible foam catalyst manufactured by Bayer AG)
    0.4 part of KS 43 (a mixture of low molecular weight alkylated siloxanes as foam stabilizer: manufacturer—Bayer AG)
Diisocyanate component
    80 parts of isocyanate III
    20 parts of isocyanate IV
Polyol I: a sorbitol-started polypropylene polyethylene glycol ether having an OH-number of 28
Polyol II: a 1,2-propylene-glycol-started polypropylene glycol ether having an OH-number of 48
Isocyanate III: an isocyanate mixture having an NCO content of 32.5 obtained by phosgenating the reaction product of aniline and formaldehyde
Isocyanate IV: a mixture of 65% of 2,4-diisocyanatotoluene and 35% of 2,6-diisocyanatotoluene having an NCO-content of 48.3%.

107 parts of the polyol component mixture described above were mixed with 48.5 parts of diisocyanate component using a high-speed stirrer (NCO-index 90). The resulting mixture was left to foam freely. A foam having a gross density of 40 kg/m³ and a compression hardness of 3.05 kPa (40% deformation) was obtained.

7.2 Comparison Example (using polymer polyols)

Polyol II in the polyol component mixture described above in 7.1 was completely replaced by the same quantity (in parts by weight) of the polymer polyol used in Example 1.1. The procedure of 7.1 was repeated using this polyol component mixture. A foam having a gross density of 40 kg/m³ and a compression hardness of 4.0 kPa (40% deformation) was obtained.

7.3 (polymer polyamines of the present invention)

Half the quantity (in parts by weight) of polyol II in the polyol component mixture described in 7.1 was replaced by the polymer polyamine of Example 1. The procedure of Example 7.1 was repeated using the polyol component mixture. The product foam had a considerably improved compression hardness of 8.83 kPa (40% deformation) and a gross density of 40 kg/m³.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyetherbased, urethane-group-containing polyamine which contains a polymer and/or copolymer of an unsaturated monomer comprising:
    (a) converting a urethane-group-containing NCO-prepolymer of (i) a difunctional or polyfunctional polyalkylene ether polyol having a molecular weight of from 1,000 to 10,000 which polyol contains from 1 to 60 wt. % of a grafted-on polymer and/or copolymer of an unsaturated monomer with (ii) an excess molar quantity of an organic polyisocyanate into the corresponding carbamate in aqueous dispersion by reacting the prepolymer with an alkaline aqueous medium at a temperature of from 0° to 40° C. in a quantity such that the equivalent ratio of OH$^\ominus$ groups to NCO groups is greater than 1.01 to 1;

(b) converting the thus-produced carbamate into an amine by adding an equivalent or slightly greater than equivalent quantity of an acid ion exchanger; and (c) separating the thus-produced urethane-group-containing polymer polyether polyamine from the reaction mixture.

2. The process of claim 1 wherein the polyalkylene ether prepolymer additionally contains urea and/or biuret and/or allophanate groups.

3. The process of claim 1 wherein the reactants converted in step (a) include a lower molecular weight chain-extending agent having a molecular weight of from 18 to 400.

4. The process of claim 1 wherein an inert water-miscible organic solvent is employed in step (a).

5. The process of claim 1 wherein the NCO-prepolymer is made from a difunctional or trifunctional polyalkylene ether polyol having a molecular weight of from 2,000 to 6,000 which polyol contains from 5 to 40 wt. % graft polymer and/or copolymer of an unsaturated monomer.

6. The process of claim 1 or 5 in which the graft polymer and/or copolymer used is based on a monomer selected from the group consisting of acrylonitrile, methacrylonitrile, styrene, α-methyl styrene, acrylic acid alkyl ester, methacrylic acid alkyl ester and mixtures thereof.

7. The process of claim 1 or 5 in which the graft copolymer is based on acrylonitrile with styrene or methacrylic acid methyl ester.

8. The process of claim 1 wherein the NCO-prepolymer is prepared with a quantity of polyisocyanate such that the NCO/OH-ratio is from 1.5:1 to 2.8:1.

9. The process of claim 1 wherein the polyisocyanate is modified by urea and/or biuret and/or allophanate groups.

10. The process of claim 1 wherein the alkaline aqueous medium is an alkali hydroxide solution in which a hydroxyl ion/NCO group ratio of from 1.01:1 to 1.6:1 is maintained.

11. The process of claim 1 wherein from 1.01 to 2 equivalents of hydrogen ions emanate from the ion exchanger for each equivalent of alkali.

12. A urethane-group-containing polymer polyether polyamine based on polyalkylene ether residues having a molecular weight of from 1,000 to 10,000, a graft polymer or copolymer content of from 0.65 to 59.3 wt. %, and from 0.11 to 2.9 wt. % terminal NH$_2$ groups attached to the polyalkylene ether residue by a urethane group in the organic polyisocyanate.

13. A process for the production of polyurethane plastics, elastomers and foams comprising:

(a) converting a urethane-group-containing NCO-prepolymer of (i) a difunctional or polyfunctional polyalkylene either polyol haing a molecular weight of from 1,000 to 10,000 which polyol contains from 1 to 60 wt. % of a grafted-on polymer and/or copolymer of an unsaturated monomer with (ii) an excess molar quantity of an organic polyisocyanate into the corresponding carbamate in aqueous dispersion by reacting the prepolymer with an alkaline aqueous medium at a temperature of from 0° to 40° C. in a quantity such that the equivalent ratio of OH$^\ominus$ groups to NCO groups is greater than 1.01 to 1;

(b) converting the thus-produced carbamate into an amine by adding an equivalent or slightly greater than equivalent quantity of an acid ion exchanger;

(c) separating the thus-produced urethane-group-containing polymer polyether polyamine from the reaction mixture; and (d) reacting the polymer polyether polyamine separated in (c) with a polyisocyanate.

* * * * *